Sept. 18, 1956  A. E. ANDERSON  2,763,459
DUST CAP FOR MILKING SYSTEMS
Filed June 27, 1952
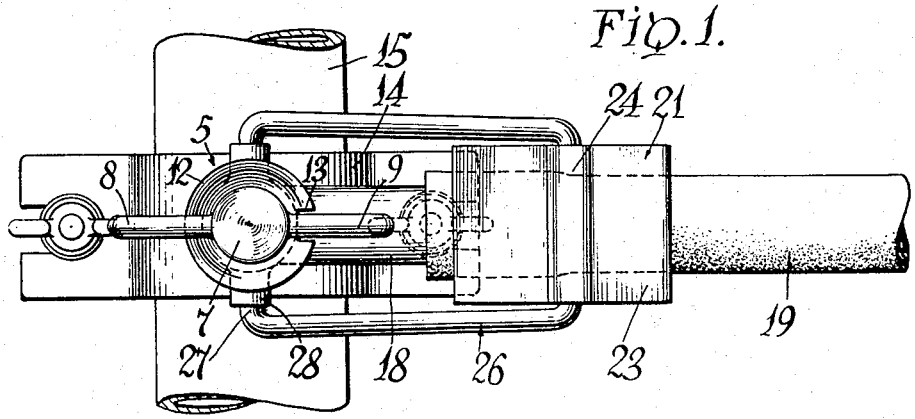
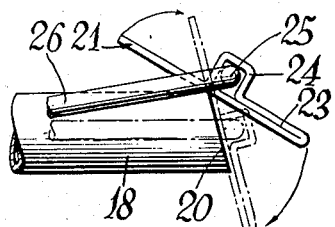
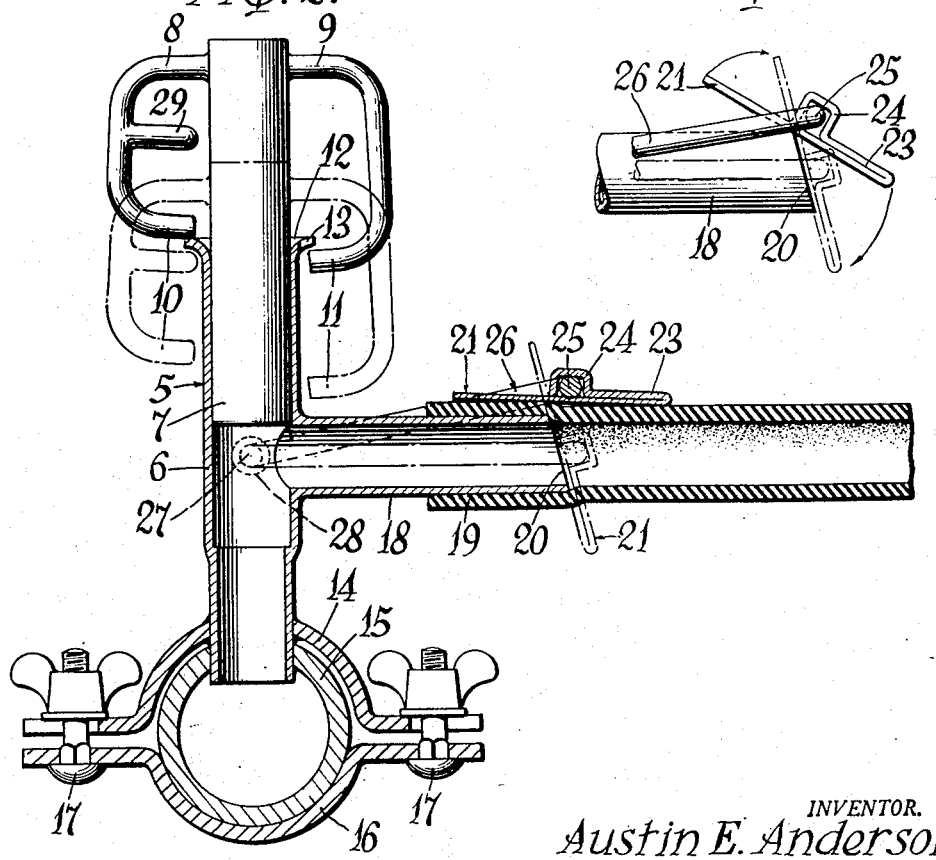
INVENTOR.
Austin E. Anderson,
BY
Beau, Brooks, Buckley & Beau.
ATTORNEY.

United States Patent Office 2,763,459
Patented Sept. 18, 1956

2,763,459

DUST CAP FOR MILKING SYSTEMS

Austin E. Anderson, Jamestown, N. Y.

Application June 27, 1952, Serial No. 296,059

2 Claims. (Cl. 251—147)

This invention relates in general to milking machine systems and in particular to a nipple or valve to which a milking machine is connected for a milking operation. In a modern dairy a milk conducting pipe extends along the several stalls and is equipped at intervals with valved nipples onto which the hose from the milking machine is selectively slipped prior to opening the nipple valve. Between periods of usage it is desired to protect the nipple from collecting dust and other foreign matter.

The principal object of this invention is to provide a valve or cap which will automatically close the hose attaching nipple when the milking machine hose is removed therefrom, thereby preventing the accumulation of dust and foreign matter in the free outer end thereof to preclude it entering the milk flow.

Another object is to provide a valve or cap so pivoted that it may be easily raised from its closed position by means of the milking hose which may then be readily attached to the nipple. This dust excluding cap is pivotally mounted and so designed and arranged as to move to its closed position by means of gravity. The outer end of the suction nipple is inclined backwardly so that when the cap is engaged with the surface thereof, it will be held tightly thereagainst.

A further object is to provide a milk conduit which may be readily flushed with a cleansing solution in a practical manner and without the loss of the washing liquid.

The above objects and advantages have been accomplished by the device shown in the accompanying drawings, in which:

Fig. 1 is a top plan view of a valved nipple embodying the present invention;

Fig. 2 is a longitudinal sectional view thereof; and

Fig. 3 is a fragmentary view depicting the closing action of the protective closure.

The closure device is used in connection with the shut-off valve used in milking systems where a number of valves are arranged on a main pipe line to facilitate the selective attachment of a milker thereto. The protector, which is in the form of a closure plate, is designed to automatically close the end of the suction nipple to the exclusion of dust and other foreign matter when the milk hose has been removed therefrom. During the use of the protector, the shut-off valve may be secured in its closed position from being lifted from its seat by the pressure of a cleaning solution flowing through the system.

As shown in the drawings, 5 represents the shut-off valve used in the milking system and which is substantially the same as that shown and described in my co-pending application, relating to a milking machine and given Serial No. 159,116, now Patent No. 2,723,829. This valve comprises a housing 6 in which is slidable a valving member 7 in the nature of a plug that is limited in its axial movement by means of fingers 8 and 9 having inturned ends 10 and 11, respectively cooperating with a locking flange 12. These two ends or lugs are engageable with the locking flange on the valve housing to stop axial movement of the plug valve except when the inturned ends are in registration with a notch 13 in the locking flange. The valve body is preferably formed at its lower end with a clamping bracket 14 which is curve-shaped on its lower surface for fitting over the outside of the milk pipe line 15. A clamp 16 is arranged opposite the bracket 14 and is secured thereto by means of bolts 17.

Extending preferably at right angles to the valve housing is the nipple 18 to which the milk hose 19 is attached. The end surface of the nipple is shown inclined backwardly to form a beveled seat 20 upon which the closure plate 21 is designed to close more in the nature of a flap valve. The closure plate serves as a dust cap and comprises a flat body, which may be made of light material and have its bottom edge portion preferably folded upon itself in a return bend 23 and shaped to provide a journal bearing 24 for receiving the transverse shaft part 25 of a supporting hanger 26. The hanger is substantially U-shaped and has two side arms that extend toward and straddle the valve housing 6 with their free ends being turned inwardly to form trunnions 27 for engagement in the bearings 28 on the valve housing. The return bend 23 of the cap adds weight to its lower portion downwardly from the shaft part 25, and therefore the cap will assume a substantially vertical pendant position, when free of the seat, to engage the latter for proper facial contact when it falls thereon by gravity.

When the milk hose 19 is to be attached to the nipple, the end of the hose is engaged with the lower weighted edge of the dust excluding cap and lifted thereby to raise it to an elevated position by swinging the cap about its supporting shaft 25 until the inner or upper edge of the cap rides over onto the upper surface of the nipple to fulcrum thereon as the hose is brought into axial alinement with the nipple and moved thereonto, at which time the cap will assume a substantially horizontal position of rest upon the hose, all as is shown in Fig. 2. When the hose is detached from the nipple, the closure plate will be released from its open position on top of the milking hose and drop to its closed position, shown in broken lines in Fig. 3. Should the cap be lifted by manually grasping its hanger, the weighted end will bring the closure plate to a vertical position so that when it is again lowered to its seat the weighted end will initially engage the beveled seat and slide downwardly thereon into full engagement therewith. In this connection, it will be noted that the length of the side arms of the hanger 26 is such that the dust cap will seat firmly on the beveled surface 20 and not override the same. The closure serves to maintain the nipple clean of dust accumulation when the system is not in use.

After each use, the system may be cleansed by flushing the milk passages. This is readily accomplished herein by flowing a cleansing solution through the pipe line 15 after first securing the several nipple valves 5 closed against being forced open by the fluid pressure. The valve may be secured in its closed position by engaging the lug 29 beneath the lock flange 12 after first passing it downwardly through the notch 13. This securement prevents the fluid under pressure lifting the closure plate from its seat.

The invention is shown as applied to a milking system, but it is obvious that it may be used in any other place where it is desired to protect the end of a tube and to close the conduit passage. The dust cap is self-closing and drops readily onto its seat when the milk hose is removed. When the hose is attached the dust cap lies flat upon it in a compact manner. The plug valve is simple in construction and readily secured in its closed position.

The foregoing description has been given in detail without thought of limitation since the inventive principles are capable of assuming other physical embodiments without departing from the spirit of the invention and the scope of the appended claims.

What is claimed is:

1. In a milking machine, a nipple having an upwardly and rearwardly inclined end surface, a flap cap engageable with the inclined surface of the nipple to close the latter, a hanger pivotally mounted at one end on the nipple and pivotally engaged at its opposite end with the cap to hold it resting upon the inclined surface, said cap being in the form of a flat plate bent upon itself on its lower edge to provide a weighted lower portion and to form a bearing for the hanger.

2. A hose nipple according to claim 1, wherein the hanger is in the form of a U-shaped member straddling the nipple and having the free ends of its side arms inturned into oppositely facing bearings on the opposite sides of the nipple, with the flat plate being bent about the arm-joining cross part of the hanger for swinging between the side arms thereof.

References Cited in the file of this patent

UNITED STATES PATENTS

| | | |
|---|---|---|
| 562,892 | Gates | June 30, 1896 |
| 1,041,509 | Petrie | Oct. 15, 1912 |
| 1,044,707 | Sutton | Nov. 19, 1912 |
| 1,118,594 | Spencer | Nov. 24, 1914 |
| 1,316,739 | Pitcher | Sept. 23, 1919 |
| 2,050,145 | Wiseman | Aug. 4, 1936 |
| 2,147,230 | Anschicks | Feb. 14, 1939 |
| 2,206,150 | Barber | July 2, 1940 |
| 2,627,282 | Comer | Feb. 3, 1953 |
| 2,636,518 | Strebel | Apr. 28, 1953 |